Patented Aug. 4, 1925.

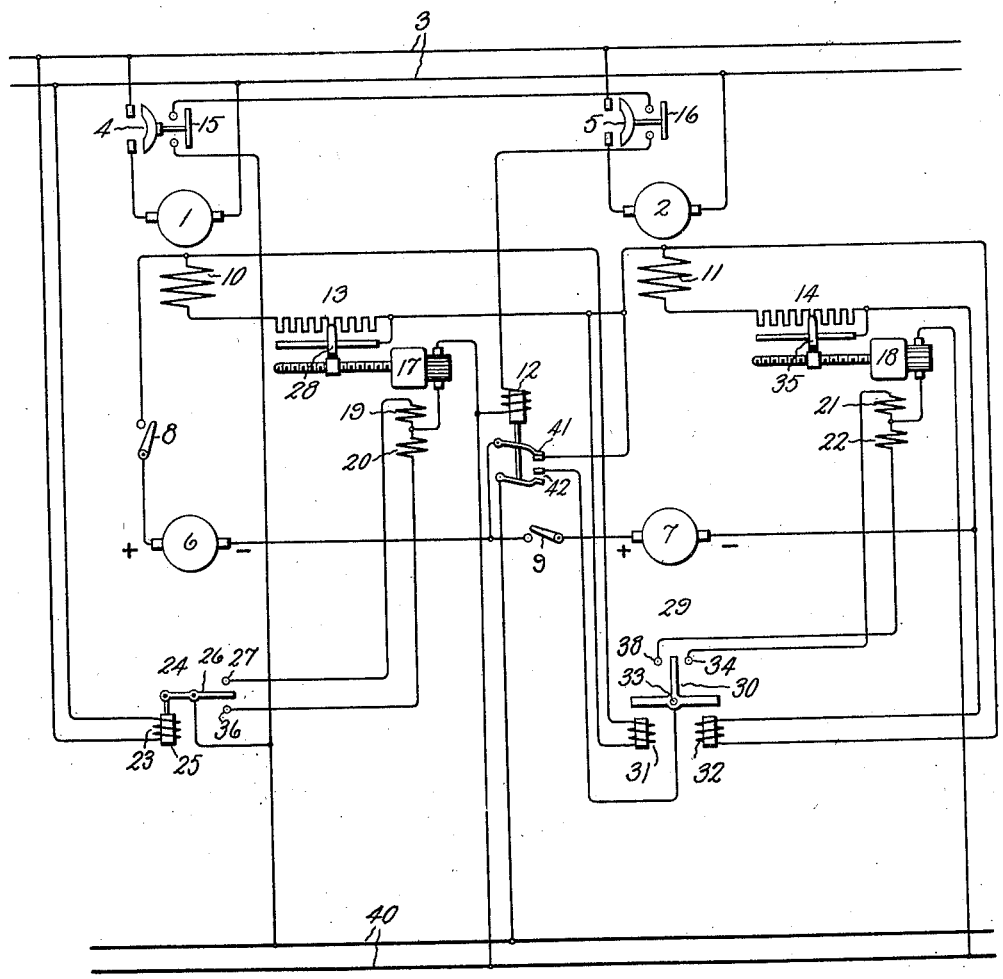

1,548,754

UNITED STATES PATENT OFFICE.

CYRIL JOHN SARJEANT, OF RUGBY, ENGLAND, ASSIGNOR TO GENERAL ELECTRIC COMPANY, A CORPORATION OF NEW YORK.

REGULATING SYSTEM FOR DYNAMO-ELECTRIC MACHINES.

Application filed November 28, 1923. Serial No. 677,554.

*To all whom it may concern:*

Be it known that I, CYRIL JOHN SARJEANT, a subject of the King of Great Britain, residing at Rugby, in the county of Warwick, England, have invented certain new and useful Improvements in Regulating Systems for Dynamo-Electric Machines, of which the following is a specification.

My invention relates to regulating systems for dynamo electric machines, and more particularly to machines which are installed in what are known as automatic substations. In such stations it is sometimes desirable, when running two or more machines in parallel, to connect the exciting means and the excitation controlling means of both machines in series so as to maintain the proper division of load between the machines. When operating in this manner, however, a difficulty arises due to the fact that, although the field currents of the two machines are equal when so connected, both of the excitation controlling means may not be in similar positions even though the voltages of the machines are equal. Under such conditions, if it is necessary to disconnect one machine from the line for any cause, the excitation controlling means of the machine, which is left connected to the line, may be in such a position as to cause the voltage to change and give a heavy generating or regenerating current when the other machine is disconnected.

One object of the present invention is to prevent the occurrence of such a condition and to that end it consists in providing improved means for automatically maintaining a predetermined ratio between the excitation of a plurality of dynamo electric machines.

In accordance with my invention I operate the excitation controlling means of one machine in accordance with the operation of the excitation controlling means of the other machine to maintain a predetermined ratio between the excitation of the machines.

My invention will be better understood from the following description taken in connection with the accompanying drawing and its scope will be pointed out in the appended claims.

In the accompanying drawing, the single figure of which is a diagrammatic view showing one embodiment of my invention, two generators 1 and 2 are illustrated as supplying power to a line 3 through suitable switching means such as the circuit interrupters 4 and 5. These circuit interrupters may be of any suitable type and may be controlled either automatically or manually in any well known manner so that the generators may be connected individually or in parallel to said circuit. As shown, when the circuit interrupter 4 is closed, the generator 1 is connected to the line 3 and when the circuit interrupter 5 is closed, the generator 2 is connected to the line 3.

In order that the generators may be used individually as well as in parallel, it is desirable that suitable means should be provided whereby the field windings of each generator may be independently energized when the generators are used individually and may be connected in series so that the same current flows through both field windings when the generators are connected in parallel.

The field circuits of the generators 1 and 2 comprise respectively the exciters 6 and 7, the manually controlled switches 8 and 9, the field windings 10 and 11 and the motor operated field rheostats 13 and 14 for controlling the excitation of the generators.

When it is necessary to excite only the generator 1, the switch 8 is closed and the switch 9 is opened so that there is a circuit completed from the positive terminal of the exciter 6 through the switch 8, field winding 10, rheostat 13, contacts 41 of a contactor 12 to the negative terminal of the exciter 6. When only the generator 2 is used, the switch 9 is closed and the switch 8 is open so that a circuit is completed from the positive terminal of the exciter 7 through the switch 9, contacts 41 of the contactor 12, field winding 11, rheostat 14 to the negative terminal of the exciter 7. It will be observed that both field circuits include the contacts 41 of the contactor 12, one of which is connected to a point between the exciters 6 and 7 and the other one is connected to a point between the field windings 10 and 11, so that the exciting currents of the two generators tend to flow in opposite direction through these contacts when they are in engagement. Therefore in order to effect a series connection of the two field circuits when the field windings of both generators are energized and it is desirable to connect the two generators is parallel it is only necessary to open the contacts 41 of the contactor 12. For accomplishing this result automatically the circuit interrupters 4 and 5 are provided with auxiliary contacts 15 and 16 respectively which complete the circuit for the contactor 12 when both machines are connected to the line 3. When the contactor 12 is energized it opens its contacts 41 so that the field windings 10 and 11 of the generators, the motor operated field rheostats 13 and 14 and the exciters 5 and 6 are connected in series, thus giving series excitation to the generators 1 and 2. When, however, either one of the machines is disconnected from the circuit 3, the contacts 41 of the contactor 12 are closed to cause individual excitation of the generators.

The field rheostat 13 is operated by a motor 17 and the field rheostat 14 is operated by a motor 18, these two motors being supplied with current from a suitable source such as a control bus 40 which also supplies current for operating the contactor 12. These two motors have two field windings 19, 20 and 21, 22 respectively, one winding of each motor being for forward operation and the other for operating in the reverse direction.

In order that the voltage of the line 3 may be maintained at a constant value, it is desirable that a suitable automatic voltage regulator should control one or both of the field rheostats so as to accomplish this result. As shown the voltage of the line 3 is measured by a coil 23 of a contact making voltmeter 24 which controls the rheostat 13. If the voltage is low, the plunger 25 of the voltmeter drops and causes a pivoted arm 26 to engage with a contact 27. This completes a circuit for operating the motor 17 of the rheostat 13 through the field winding 19 and causes the motor to move the arm 28 of the field rheostat 13 in such a direction as to cut out resistance and raise the voltage of machines 1 and 2.

The desired voltage regulation for the two machines could be obtained merely by adjusting the rheostat 13 either automatically or manually if the generators were always connected to and disconnected from the line simultaneously. It will be observed, however, that while the rheostat 13 may be set so that both machines will generate the desired voltage when both field circuits are in series, the setting of the rheostat may be entirely wrong for the machine 1 to generate the same voltage when the generator 2 is disconnected from the line. Therefore it is desirable that the rheostats in both field circuits should be kept so adjusted, while the generators are operating in parallel, that if either one of the generators is disconnected from the line, the same value of exciting current will continue to flow through the field winding of the connected machine, as when it was operating in parallel with the other generator.

For accomplishing this result, I provide an arrangement for maintaining the voltage drop across the field winding 11 and the rheostat 14 equal to the voltage drop across the field winding 10 and the rheostat 13. This arrangement comprises a balanced relay 29 which is so connected as to be responsive to the relative voltage drops of the two field circuits and which controls the motor operated rheostat 14 so as to equalize the resistances of the two field circuits. As the arm 28 of the rheostat moves to cut out resistance in response to the operation of the voltmeter 24, the voltage drop across the field winding 10 and rheostat 13 is decreased and the voltage drop across the field winding 11 and the rheostat 14 is increased, thus causing unequal currents to flow in the two windings 31 and 32 of the relay 29. Since the greater current is flowing through winding 32, the movable arm 30 which is pivoted at 33 is attracted by the winding 32 and engages with the contact 34. When this movable arm engages contact 34 it completes the circuit for operating the motor 18 through its field winding 21 so that the arm 35 of the field rheostat 18 cuts out resistance. As soon as the resistances of the two field circuits are equal the current balance is restored in the windings 31 and 32 and the moving arm 30 disengages the contact 34 and breaks the circuit of the motor 18 so that the movement of the arm 35 of the rheostat 14 is stopped.

If the voltage is high, the plunger 23 of the contact making voltmeter 15 is raised to cause the pivoted arm 26 to engage with the contact 36. A circuit is then completed for the motor 17 through its field winding 20 so that the motor operates in the reverse direction and causes the arm 28 to insert resistance in the field circuits so as to lower the voltages of the machines 1 and 2.

As soon as the arm 28 operates to insert resistance, the voltage drop across the field winding 10 and resistance 13 is increased and the drop across the field winding 11 and rheostat 14 is decreased, thus causing unequal currents to flow in the two coils 31 and 32 of the differential relay 29. As the greater current now flows through the winding 31, the movable arm 30 of the differential relay 29 is attracted by the winding 31 and engages the contact 38. This completes the circuit for operating the motor 18 through its field winding 22 and causes the motor to move the arm 35 of the field rheostat 14 so as to insert resistance in the field current. As soon as the resistance of the field circuits are equal so that the currents through the windings 31 and 32 are equal the movable arm 30 breaks the circuit of motor 18 and stops the movement of the arm 35 of the rheostat 14.

From the above description it is evident that the balance relay 29 controls the rheostat 14 so as to maintain the resistances of the two field circuits equal. Therefore, if either machine is disconnected from the line by the opening of its respective circuit interrupter, so that the contacts 41 of the contactor 12 are closed, the field current through the machine which remains connected to the line is the same after the contacts 41 are closed as when the contacts were open.

While I have shown automatic means for adjusting the rheostat 13 in response to the voltage of the line 3, it is evident that my invention is not limited to such an arrangement as the rheostat may be operated by hand or in any other suitable manner, in which case the balance relay 29 operates in the manner above described to control the rheostat 14 to maintain a predetermined ratio between the excitation of the machines.

Furthermore, it is desirable that the balance relay 29 should be operative to control the rheostat 14 in the manner above described only when both generators are connected to the line 3.

In order to accomplish this result the contactor 12 is provided with a second set of contacts 42 which are closed when the contactor is energized and which are connected in any suitable manner in the circuits of the motor 18 so that the circuits of the motor can be closed by the relay 29 only when both machines are connected to the line 3. As shown, the contacts 42 are connected between the movable arm 30 and the control bus 40.

When only the generator 2 is in operation, the field current thereof may be varied to maintain the voltage constant in any well known manner not shown.

While I have shown and described one embodiment of my invention, I do not desire to be limited thereto, but seek to cover in the appended claims all those modifications thereof that fall within the true spirit and scope of my invention.

What I claim as new and desire to secure by Letters Patent of the United States, is:—

1. In combination, a plurality of dynamo electric machines, means for exciting said machines, excitation controlling means for each machine, and means for automatically operating the excitation controlling means of one machine in accordance with the operation of the excitation controlling means of another machine to maintain a predetermined ratio between the excitation of said machines.

2. In combination, a pair of dynamo electric machines, an electric circuit, switching means whereby said machines may be connected individually or in parallel to said circuit, field windings for respectively controlling the excitation of said machines, regulating means for controlling the strength of each field winding, and means for controlling the operation of one regulating means in accordance with the operation of the other regulating means to maintain a predetermined ratio between the excitation of the respective machines.

3. In combination, a plurality of generators, a field circuit for each generator comprising a field winding and an adjustable resistor, means adapted to be operated to adjust the resistor in the field circuit of one of said generators, and means operative in response to the relative resistances of the field circuit of one of said generators and the field circuit of another one of said generators for controlling the adjustable resistor in the field circuit of said other generator to maintain the resistances of both field circuits equal.

4. In combination, a supply circuit, a plurality of generators adapted to be connected in parallel to supply current to said supply circuit, a field circuit for each generator comprising a field winding and an adjustable resistor, means adapted to be operated to adjust the resistor in the field circuit of one of said generators, and means operative to equalize the resistances of all of the field circuits when the resistances of said field circuits are unequal.

5. In combination, a supply circuit, a plurality of generators adapted to be connected in parallel across said supply circuit, a field circuit for each generator comprising a field winding and an adjustable resistor in series therewith, said field circuits being adapted to be connected in series, means responsive to the voltage of said supply circuit for controlling the adjustable resistor in one of said field circuits, and means responsive to the relative voltage drops across said one of said field circuits and another one of said field circuits for controlling the adjustable resistor in said other one of said field circuits.

6. In combination, a supply circuit, a plurality of generators adapted to be connected in parallel across said supply circuit, means for exciting each generator comprising an exciter, a field winding and a motor operated rheostat, means adapted to be operated whereby said exciters, said field windings and said motor operated rheostats are connected in a series circuit, a voltage relay responsive to the voltage of said supply circuit for controlling the motor operated rheostat of the exciting means of one of said generators, and a balance relay having one winding energized in accordance with the voltage drop across the field winding and the motor operated rheostat of the exciting means of said one of said generators and another winding energized in accordance with the voltage drop across the field winding and the motor operated rheostat of the exciting means of another one of said generators for controlling said last mentioned motor operated rheostat.

7. In combination, a pair of dynamo electric machines, an electric circuit, switching means whereby said machines may be connected individually or in parallel to said circuit, field windings for respectively controlling the excitation of said machines, a pair of exciters connected in series and in series with said field windings, a contactor adapted to complete a circuit from a point between said exciters to a point between said field windings whereby said exciters may excite said field windings individually, and means cooperating with said switching means arranged to control said contactor to cause individual excitation whenever either of said machines is disconnected from said circuit and cause series excitation whenever both machines are connected to said circuit.

8. In combination, a pair of dynamo electric machines, an electric circuit, switching means whereby said machines may be connected individually or in parallel to said circuit, field windings for respectively controlling the excitation of said machines, a pair of exciters connected in series and in series with said field windings, a contactor adapted to complete a circuit from a point between said exciters to a point between said field windings whereby said exciters may excite said windings individually, means cooperating with said switching means arranged to control said contactor to cause individual excitation whenever either of said machines is disconnected from said circuit and cause series excitation whenever both machines are connected to said circuit, regulating means for controlling the strength of each field winding, and means for controlling the operation of one regulating means in accordance with the operation of the other regulating means to maintain a predetermined ratio between the excitation of the respective machines.

In witness whereof, I have hereunto set my hand this fourteenth day of November, 1923.

CYRIL JOHN SARJEANT.

Witnesses:
N. EDWIN WALHN,
J. A. FOSTER.